US011897805B2

(12) United States Patent
Zhao (10) Patent No.: US 11,897,805 B2
(45) Date of Patent: Feb. 13, 2024

(54) FORMING APPARATUS FOR CURVED TEMPERED GLASS, AND FORMING METHOD

(71) Applicant: LUOYANG LANDGLASS TECHNOLOGY CO., LTD., Luoyang (CN)

(72) Inventor: Yan Zhao, Luoyang (CN)

(73) Assignee: Luoyang Landglass Technology Co., Ltd., Luoyang (CN)

( * ) Notice: Subject to any disclaimer, the term of this patent is extended or adjusted under 35 U.S.C. 154(b) by 230 days.

(21) Appl. No.: 17/426,084

(22) PCT Filed: Jan. 21, 2020

(86) PCT No.: PCT/CN2020/073483
§ 371 (c)(1),
(2) Date: Jul. 27, 2021

(87) PCT Pub. No.: WO2020/156376
PCT Pub. Date: Aug. 6, 2020

(65) Prior Publication Data
US 2022/0089471 A1 Mar. 24, 2022

(30) Foreign Application Priority Data

Feb. 1, 2019 (CN) .......................... 201910102891.4

(51) Int. Cl.
*C03B 37/012* (2006.01)
*C03B 27/044* (2006.01)
(Continued)

(52) U.S. Cl.
CPC ...... *C03B 27/0447* (2013.01); *C03B 23/0254* (2013.01); *C03B 27/0404* (2013.01); *C03B 2225/00* (2013.01)

(58) Field of Classification Search
CPC ... C03B 27/023; C03B 27/0447; C03B 27/04; C03B 35/18
See application file for complete search history.

(56) References Cited

U.S. PATENT DOCUMENTS 3,934,996 A * 1/1976 Frank .................... C03B 35/182
65/273
4,226,608 A * 10/1980 McKelvey ............ C03B 27/044
65/273
(Continued)

FOREIGN PATENT DOCUMENTS

CN 107285611 A * 10/2017
CN 107285611 A 10/2017
(Continued)

OTHER PUBLICATIONS

International Search Report (with partial translation) and Written Opinion dated Apr. 21, 2020, issued in corresponding International Patent Application No. PCT/CN2020/073483.

*Primary Examiner* — Galen H Hauth
*Assistant Examiner* — Steven S Lee
(74) *Attorney, Agent, or Firm* — Morgan, Lewis & Bockius LLP (57) ABSTRACT

A forming apparatus includes a frame, an air grid system, and a forming system; the air grid system includes a plurality of upper air grids and a plurality of lower air grids; the upper air grids are mounted at an upper part of the frame through a lifting mechanism, and the lower air grids are mounted in the forming system at a lower part of the frame; a gradual transition section is arranged at an inlet side of the forming system to enable a glass pane to be gradually arched in a transverse direction, and the gradually arched glass pane is conveyed into the forming system; and the forming system includes two groups of longitudinal forming and arching mechanisms and a plurality of transverse forming and arch-
(Continued)

ing mechanisms arranged in a glass pane conveying direction.

19 Claims, 8 Drawing Sheets

(51) Int. Cl.
*C03B 23/025* (2006.01)
*C03B 27/04* (2006.01)
*C03B 37/027* (2006.01)
*C03B 37/03* (2006.01)

(56) References Cited

U.S. PATENT DOCUMENTS

| | | | | | |
|---|---|---|---|---|---|
| 4,381,933 | A | * | 5/1983 | Schultz | C03B 35/186 65/273 |
| 4,619,683 | A | * | 10/1986 | Halberschmidt | C03B 27/0447 65/351 |
| 4,773,925 | A | * | 9/1988 | Schultz | C03B 35/187 65/273 |
| 5,009,693 | A | * | 4/1991 | Freidel | C03B 35/185 65/273 |
| 5,246,477 | A | * | 9/1993 | Kramer | C03B 35/163 65/273 |
| 8,302,429 | B2 | * | 11/2012 | Nomura | C03B 23/033 65/273 |
| 8,381,546 | B2 | * | 2/2013 | Harjunen | C03B 35/164 65/106 |
| 2004/0093903 | A1 | * | 5/2004 | Hirvonen | C03B 23/0256 65/289 |
| 2005/0000247 | A1 | * | 1/2005 | Yoshizawa | C03B 35/145 65/273 |
| 2005/0061032 | A1 | * | 3/2005 | Yoshizawa | C03B 27/0431 65/273 |
| 2006/0144090 | A1 | * | 7/2006 | Yoshizawa | C03B 35/161 65/288 |
| 2006/0179885 | A1 | * | 8/2006 | Reunamaki | C03B 23/0254 65/273 |
| 2006/0254317 | A1 | * | 11/2006 | Serrano | C03B 27/0447 65/106 |
| 2008/0260999 | A1 | * | 10/2008 | Serrano | C03B 23/033 65/106 |

FOREIGN PATENT DOCUMENTS

| | | | | | |
|---|---|---|---|---|---|
| CN | 108017265 | A | * | 5/2018 | ........... C03B 23/023 |
| CN | 108017265 | A | | 5/2018 | |
| CN | 108373257 | A | * | 8/2018 | ........... C03B 23/023 |
| CN | 207877573 | U | | 9/2018 | |
| CN | 109748486 | A | | 5/2019 | |
| CN | 209890490 | U | | 1/2020 | |
| FR | 2463750 | A1 | * | 2/1981 | ........... C03B 35/165 |
| JP | 2003095683 | A | * | 4/2003 | ......... C03B 27/0445 |
| JP | 2003095683 | A | | 4/2003 | |

* cited by examiner

FORMING APPARATUS FOR CURVED TEMPERED GLASS, AND FORMING METHOD

CLAIM FOR PRIORITY

This application is a U.S. national phase entry under 35 U.S.C. § 371 from PCT International Application No. PCT/CN2020/073483 filed on Jan. 21, 2020, which is based upon and claims the benefit of priority from the prior Chinese Patent Application No. 201910102891.4 filed on Feb. 1, 2019. The entire contents of the above applications are incorporated herein by reference.

TECHNICAL FIELD

The present disclosure belongs to the field of tempered glass processing, and specifically relates to a forming apparatus for curved tempered glass and a forming method.

BACKGROUND TECHNOLOGY

The architectural field is one of the important application fields of tempered glass. In order to pursue visual beauty and safety requirements, many buildings are designed with spherical or arc-shaped glass structures on exterior walls. These spherical or arc-shaped glass structures need to be decomposed into pieces of corresponding hyperboloid or multi-curved-surface arc-shaped tempered glass with smooth transitions for production processing and installation. This hyperboloid or multi-curved-surface arc-shaped tempered glass is prone to warping deformation during processing. The hyperboloid arc-shaped tempered glass with the warping deformation cannot be smoothly transitioned and connected during installation and connection, so it is impossible to install and constitute a satisfactory spherical or arc-shaped glass structure; and during practical production, it is difficult to produce and process this hyperboloid or multi-curved-surface arc-shaped tempered glass.

In order to ensure that the multi-curved-surface arc-shaped tempered glass does not deform as much as possible in the forming process, it is usually necessary to design a special multi-curved-surface glass tempering forming mold. Since there are many multi-curved-surface arc-shaped tempered glass specifications to constitute the spherical or arc-shaped glass structure, a special mold needs to be manufactured for multi-curved-surface arc-shaped tempered glass of each specification during production processing, leading to a large quantity of special molds of production apparatus, high manufacturing cost, and low universality of the special molds. Moreover, the special molds need to be frequently replaced, installed, and debugged during production processing, so that the production supporting time is long, and the production efficiency is low. Therefore, an apparatus that can produce multi-curved-surface tempered glass without a special mold needs to be designed, so as to improve the production efficiency and reduce the apparatus cost. There is also an apparatus that uses a flexible shaft to form glass at present. However, a transmission system of the apparatus is arranged at the end part of the flexible shaft, and includes a driving shaft and a driven shaft; and the upper part of the lower flexible shaft is also provided with a flexible shaft or roller that supports the forming. The structure is complicated, and the forming accuracy is low.

SUMMARY

The present disclosure is directed to provide a forming apparatus for curved tempered glass. Special forming molds do not need to be manufactured one by one during forming of hyperboloid curved tempered glass, multi-curved-surface curved tempered glass or specially-shaped curved tempered glass, so that forming adjustment is fast, convenient, stable and reliable, glass is hard to deform, and the production efficiency is high.

In order to achieve the above objective, the present disclosure adopts the following technical solution:

A forming apparatus for curved tempered glass is provided, which includes a frame, an air grid system, and a forming system. The air grid system includes an upper air grid group comprising a plurality of upper air grids, and a lower air grid group comprising a plurality of lower air grids. The upper air grid group is mounted at an upper half of the frame by means of a lifting mechanism, and the lower air grid group is mounted in the forming system at a lower half of the frame (referring to FIG. 1 for understanding). A gradual transition section is arranged at an inlet side of the forming system; and the gradual transition section includes a plurality of transitional transverse arching mechanisms arranged on the frame and arranged in a glass pane conveying direction to enable a glass pane to be gradually arched in a transverse direction, and the gradually arched glass pane is conveyed into the forming system.

The forming system includes two groups of longitudinal forming and arching mechanisms and a plurality of transverse forming and arching mechanisms arranged in the glass pane conveying direction; the longitudinal forming and arching mechanisms are controlled by a lower arching mechanism to perform longitudinal curve forming on the glass pane in the forming system; the transverse forming and arching mechanisms are connected to the longitudinal forming and arching mechanisms through a lower support cross beam to perform transverse curve forming on the glass pane in the forming system. The transverse forming and arching mechanism includes an elastic piece, a plurality of height adjustment mechanisms and a glass conveying mechanism mounted on the elastic piece; a center position of the elastic piece in a lengthwise direction is fixed on the lower support cross beam; and two sides of the center position or a middle section are connected to the lower support cross beam through the plurality of height adjustment mechanisms; and the elastic piece is arched through the plurality of height adjustment mechanisms.

The transitional transverse arching mechanism includes an elastic piece, a plurality of height adjustment mechanisms, and a glass conveying mechanism mounted on the elastic piece; a center position or a middle section of the elastic piece in a lengthwise direction is fixed on a support beam, and two sides of a fixed point are connected to the support beam through the plurality of height adjustment mechanisms; the elastic piece is arched through the plurality of height adjustment mechanisms; and the support beam is fixed on the frame.

The glass conveying mechanism includes a flexible shaft provided with a conveying wheel, supports, and a drive system; the flexible shaft is fixed on the elastic piece through the supports distributed at intervals, and is parallel to the elastic piece; and a center position of the flexible shaft in a lengthwise direction is connected to the drive system.

The lower air grid is composed of a plurality of lower air blowing boxes; the plurality of lower air blowing boxes are arranged between adjacent transverse forming and arching mechanisms in the lengthwise direction of the elastic piece; the lower air blowing boxes are mounted on the elastic piece, so that the lower air blowing boxes act with arching actions of the transverse forming and arching mechanisms and the longitudinal forming and arching mechanisms.

The lower air blowing boxes are respectively provided with independent air ducts.

The elastic piece is any one of a spring steel wire, a steel spring plate or a carbon fiber elastic piece.

The upper air grid includes an upper air grid longitudinal arching mechanism and an upper air grid transverse arching mechanism; the upper air grid longitudinal arching mechanism is connected to an upper arching mechanism mounted on the frame; and the upper air grid transverse arching mechanism is connected to the upper air grid longitudinal arching mechanism through an upper support cross beam.

The upper air grid transverse arching mechanism includes an elastic piece and a height adjustment mechanism; a center position of the elastic piece in the lengthwise direction is fixed on the upper support cross beam, and two sides of a fixed point is connected to the upper support cross beam through the height adjustment mechanism; the upper air grid further includes a plurality of upper air blowing boxes; the plurality of upper air blowing boxes are arranged between adjacent upper air grid transverse arching mechanisms in the lengthwise direction of the elastic piece; and the upper air blowing boxes are mounted on the elastic piece, so that angles and positions of the upper air blowing boxes vary with arching actions of the upper air grid transverse arching mechanisms and the upper air grid longitudinal arching mechanisms.

Air blowing passages are arranged in the upper air blowing boxes, and the air blowing passages in the upper air blowing boxes are not mutually communicated.

The upper air grid longitudinal arching mechanism is formed by hinging a plurality of connecting plates end to end in sequence; the connecting plate includes a protruding end away from a hinge point; the protruding ends of two adjacent connecting plates are connected through a bolt, and two ends of the bolt are hinged with the protruding ends of the two adjacent connecting plates; the bolt is connected with a nut for adjusting a distance between the protruding ends of two adjacent connecting plates through threads; and end parts of the upper support cross beam are fixedly connected to the connecting plates.

The connecting plate is a T-shaped plate, a tee-heeded plate, a trapezoid plate or a triangular plate.

The longitudinal forming and arching mechanism in the forming system is formed by rotatably connecting a plurality of chain plate assemblies end to end in sequence, and the chain plate assembly includes a protruding part away from a rotatable connection point; adjacent chain plate assemblies are connected through a connecting rod, and one end of the connecting rod is provided with a sliding block capable of sliding in a lengthwise direction of the protruding part; and the protruding part is provided with an adjustment device for adjusting a sliding travel of the sliding block.

A chain plate in the chain plate assembly is a T-shaped chain plate, a tee-heeded chain plate, a trapezoid chain plate or a triangular chain plate.

The upper arching mechanism and the lower arching mechanism each includes a power mechanism and a pulling mechanism; the power mechanism is a motor; and the pulling mechanism is a chain or a steel wire rope.

A forming method for multi-curved-surface tempered glass is provided. A forming apparatus used by the forming method includes a gradual transition section, a forming system, and an air grid system. The gradual transition section includes a plurality of transitional transverse arching mechanisms; the forming system includes a plurality of transverse forming and arching mechanisms and a plurality of longitudinal forming and arching mechanisms; and the air grid system includes an upper air grid group comprising a plurality of upper air grids and a lower air grid group comprising a plurality of lower air grids. The forming method includes the following steps:

Step I: adjusting the transitional transverse arching mechanisms in the gradual transition section and the transverse forming and arching mechanisms in the forming system to desired positions according to a radian requirement for glass to be formed in a transverse direction, and adjusting upper air grid transverse arching mechanisms and upper air grid longitudinal arching mechanisms of the upper air grid group to desired positions according to radian requirements of a glass pane to be formed in the transverse direction and a longitudinal direction;

Step II: making the glass pane heated to a softened state leave a heating furnace and enter the gradual transition section to complete transverse gradual preforming of the glass pane;

Step III: making the glass pane enter the forming system from the gradual transition section for transverse curve forming under the gravity;

Step IV: pulling two ends of the longitudinal forming and arching mechanisms to desired positions to make the glass pane complete longitudinal curve forming;

Step V: making the glass pane completing the transverse and longitudinal curve forming move in the forming system in a reciprocating manner, and making the upper air grid group and the lower air grid group blow air to cool the glass pane to complete tempering; and Step VI: pulling the two ends of the longitudinal forming and arching mechanisms to horizontal positions, lifting the upper air grid group to a set height through a lifting mechanism, and conveying the tempered glass pane out of the forming system.

In addition, the forming method for the multi-curved-surface tempered glass can further adjust the steps on the basis of the above steps to derive steps of the following two forming methods.

Derivative Method 1

Step I: adjusting the transitional transverse arching mechanisms in the gradual transition section, the transverse forming and arching mechanisms in the forming system, and the upper air grid transverse arching mechanisms of the upper air grid group to desired positions according to a radian requirement for glass to be formed in the transverse direction;

Step II: making the glass pane heated to a softened state leave a heating furnace and enter the gradual transition section to complete transverse gradual preforming of the glass pane;

Step III: making the glass pane enter the forming system from the gradual transition section for transverse curve forming under the gravity;

Step IV: pulling the two ends of the longitudinal forming and arching mechanisms and the two ends of the upper air grid transverse arching mechanisms of the upper air grid group to desired positions to make the glass pane complete longitudinal curve forming;

Step V: making the glass pane completing the transverse and longitudinal curve forming move in the forming system in a reciprocating manner, and making the upper air grid group and the lower air grid group blow air to cool the glass pane to complete tempering; and Step VI: pulling the two ends of the longitudinal forming and arching mechanisms to horizontal positions, lifting the upper air grid group to a set height through a lifting mechanism, and conveying the tempered glass pane out of the forming system.

Derivative Method 2

Step I: adjusting the transitional transverse arching mechanisms in the gradual transition section and the transverse forming and arching mechanisms in the forming system to desired positions according to a radian requirement for glass to be formed in the transverse direction, adjusting the upper air grid transverse arching mechanisms and the upper air grid longitudinal arching mechanisms of the upper air grid group to desired positions according to radian requirements of the glass pane to be formed in the transverse direction and the longitudinal direction, and pulling ends of the longitudinal forming and arching mechanisms located at an outlet side of the forming system to desired positions;

Step II: making the glass pane heated to a softened state leave a heating furnace and enter the gradual transition section to complete transverse gradual preforming of the glass pane;

Step III: making the glass pane enter the forming system from the gradual transition section for transverse curve forming under the gravity;

Step IV: pulling ends of the longitudinal forming and arching mechanisms located at an inlet side of the forming system to make the glass pane complete longitudinal curve forming;

Step V: making the glass pane completing the transverse and longitudinal curve forming move in the forming system in a reciprocating manner, and making the upper air grid group and the lower air grid group blow air to cool the glass pane to complete tempering; and Step VI: pulling the two ends of the longitudinal forming and arching mechanisms to horizontal positions, lifting the upper air grid group to a set height through a lifting mechanism, and conveying the tempered glass pane out of the forming system.

The advantages of the present disclosure are as follows.

The forming apparatus of the present disclosure is provided with the longitudinal forming and arching mechanisms for forming the glass pane in a lengthwise direction and the transverse forming and arching mechanisms for forming the glass pane in a width direction, and the longitudinal forming and arching mechanisms and the transverse forming and arching mechanisms can be adjusted into single-curvature, hyperboloid or multi-curvature structures according to production needs, so as to satisfy production of hyperboloid curved tempered glass, multi-curved-surface curved tempered glass or specially-shaped curved tempered glass; the apparatus is extremely high in universality; moreover, there is no need to make lots of special forming molds during forming; forming and adjustment are fast, convenient, stable, and reliable; glass is hard to deform; and the production efficiency is high.

According to the forming apparatus of the present disclosure, since the longitudinal forming and arching mechanism and the transverse forming and arching mechanism can be separately adjusted, and one set of apparatus can produce flat tempered glass, transversely curved tempered glass arched in the lengthwise direction, and longitudinally curved tempered glass arched in the width direction, and curved tempered glass of various shapes, such as hyperboloid curved tempered glass, multi-curved-surface curved tempered glass or specially-shaped curved tempered glass arched in both the lengthwise and width directions.

By the use of the elastic pieces in the present disclosure, the transverse forming and arching mechanisms taking the flexible shafts as main bodies and the upper air grids are more uniform and smoother in arching, which is conductive to improving the accuracy of a curved surface of curved tempered glass; moreover, supports for the flexible shafts can be reduced due to the rigidity of the elastic pieces, so that the structures of the transverse forming and arching mechanisms are simplified, the cost of production of the apparatus is reduced, and the frequency of mechanical failures is reduced.

The gradual transition section is arranged in front of the forming system in the present disclosure, the glass pane can be preformed before it enters the forming system to lower the difficulty of curve forming of the glass pane; and moreover, the gradual transition section is to curve the glass pane in the transverse direction, which can also reduce the transverse size of the glass and facilitate the glass pane to successfully enter the forming system that has been transversely arched.

Marks in the drawings: 1: frame; 2: upper air grid; 3: forming system; 4: upper air grid longitudinal arching mechanism; 5: upper arching mechanism; 6: lifting mechanism; 7: longitudinal forming and arching mechanism; 8: lower arching mechanism; 9: upper air grid transverse arching mechanism; 10: upper support cross beam; 11: height adjustment mechanism; 111: screw rod and nut mechanism; 112: motor; 12: transverse forming and arching mechanism; 13: lower support cross beam; 14: glass conveying mechanism; 141: flexible shaft; 142: conveying wheel; 143: support; 15: upper air blowing box; 16: elastic piece; 161: pressing piece; 17: lower air blowing box; 18: extending part; 19: gradual transition section; 191: transitional transverse arching mechanism; 20: connecting plate; 201: hinge point; 202: protruding end; 203: rotating shaft; 21: bolt; 211: bolt head; 22: nut; 23: chain plate assembly; 2301: chain plate; 2302: duplex chain wheel; 2303: adjustment chain wheel; 2304: rotating shaft; 2305: top plate; 2306: screw rod; 2307: sliding block; 2308: splined hub; 2309: connecting block; 2310: bottom plate; 2311: hexagonal shaft; 2312: bevel gear pair; 2313: protruding part; 24: connecting rod; 25: rotating shaft; 26: driving chain wheel; 27: driving gear; 28: driven gear; and 29: air inlet.

DETAILED DESCRIPTION

The technical solutions of the present disclosure are further described below through specific implementations in combination with accompanying drawings. The "longitudinal direction" in this specification refers to a direction parallel to a moving direction of a glass pane, and the "transverse direction" refers to a direction perpendicular to the moving direction of the glass pane.

Figure 1:
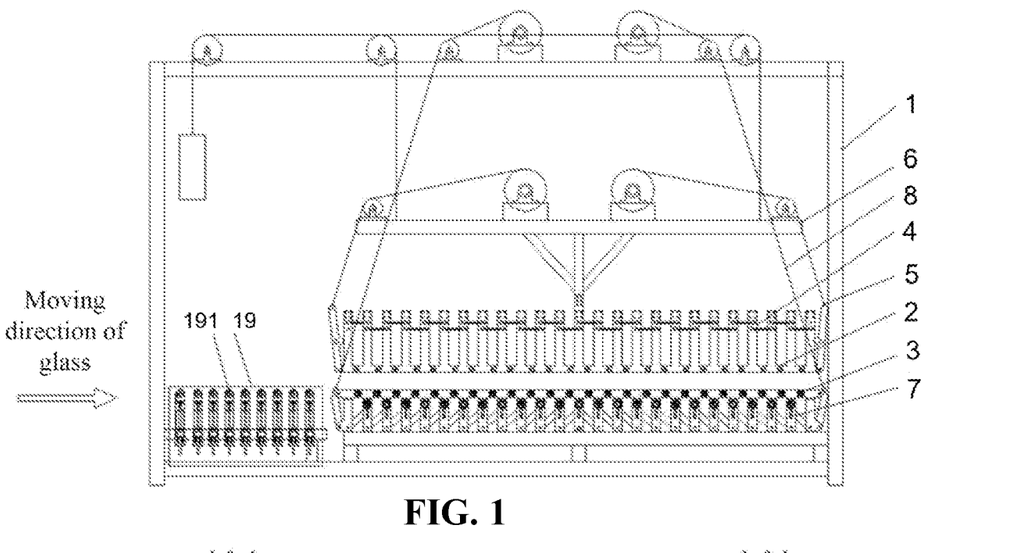
FIG. 1 is a front view of a forming apparatus of the present disclosure.
Figure 2:
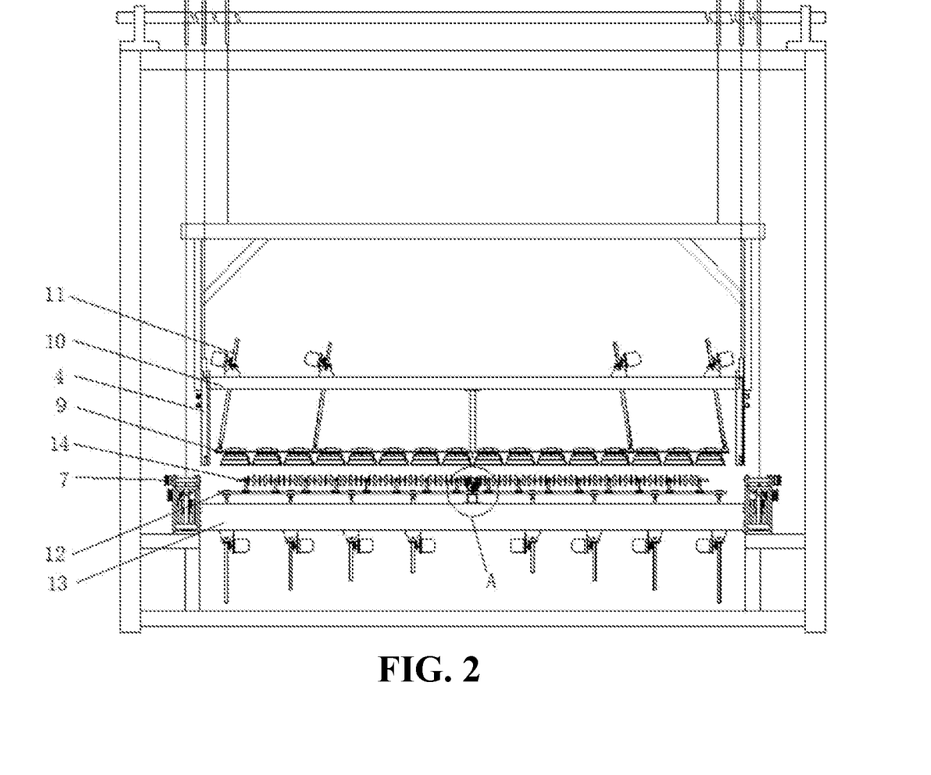
FIG. 2 is a side view of a forming apparatus of the present disclosure.

As shown in the figures, a forming apparatus for curved tempered glass includes a frame 1, an air grid system, and a forming system 3. The air grid system includes a plurality of upper air grids and a plurality of lower air grids. The upper air grids are mounted at an upper half of the frame 1 by means of a lifting mechanism 6, and the lower air grids are mounted in the forming system 3 at a lower half of the frame 1; and the upper half of the frame 1 and the lower half of the frame 1 are as shown in FIG. 1.

Figure 13:
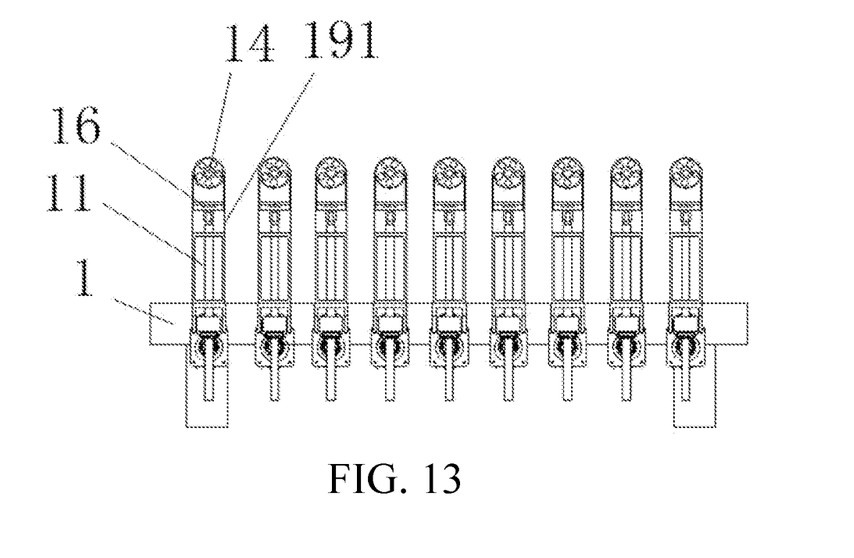
FIG. 13 is a schematic structural diagram of a gradual transition section in the present disclosure.

An inlet side of the forming system 3 is provided with a gradual transition section 19; the gradual transition section 19 includes a plurality of transitional transverse arching mechanisms 191 arranged on the frame 1 and arranged in a glass pane conveying direction, and a glass conveying mechanism 14 mounted on the transitional transverse arching mechanisms 191, so that a glass pane is gradually arched in a transverse direction, and the gradually arched glass pane is conveyed into the forming system 3; and the transitional transverse arching mechanism 191 can be arranged on either the frame 1 or an independent frame.

Figure 4:
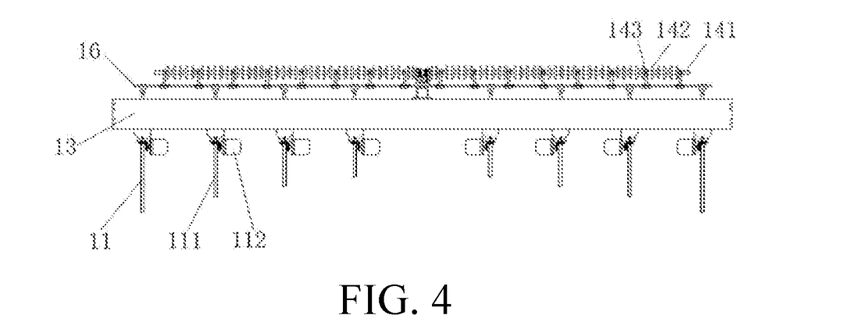
FIG. 4 is a schematic structural diagram of a transverse forming and arching mechanism in the present disclosure.
Figure 5:
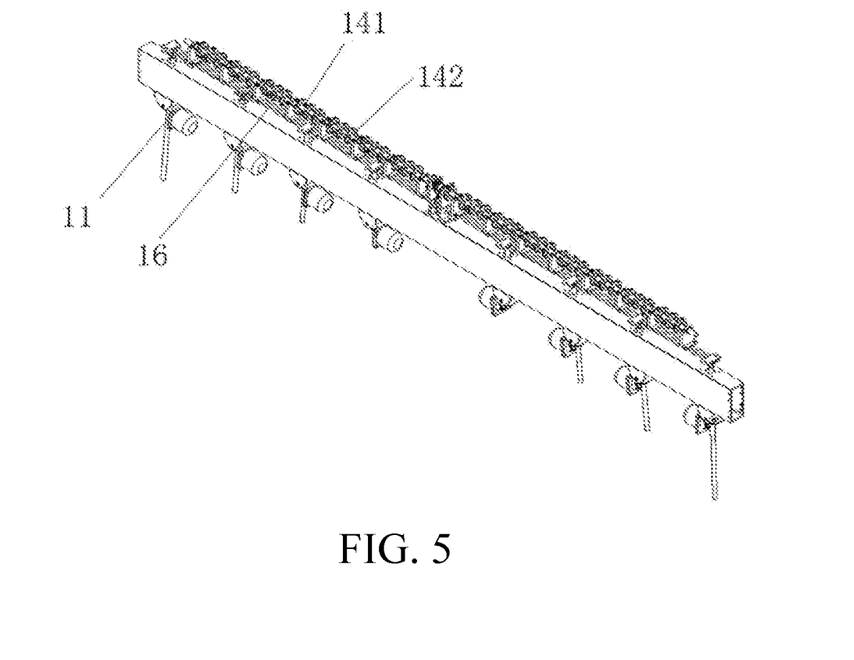
FIG. 5 is an axonometric drawing of a transverse forming and arching mechanism in the present disclosure.

The forming system 3 includes two groups of longitudinal forming and arching mechanisms 7 and a plurality of transverse forming and arching mechanisms 12 arranged in the glass pane conveying direction; two ends of the longitudinal forming and arching mechanisms 7 in the glass pane conveying direction are connected to a lower arching mechanism 8 mounted on the frame 1, and are lifted by the lower arching mechanism 8 to realize longitudinal arching of the longitudinal forming and arching mechanisms 7 to perform longitudinal curve forming on the glass pane in the forming system 3; the transverse forming and arching mechanisms 12 are connected to the longitudinal forming and arching mechanisms 7 through a lower support cross beam 13; the transverse forming and arching mechanism 12 includes an elastic piece 16, a plurality of height adjustment mechanisms 11, and a glass conveying mechanism 14; a center position of the elastic piece 16 in a lengthwise direction is fixed on the lower support cross beam 13, and two sides of a fixed point are connected to the lower support cross beam 13 through the height adjustment mechanisms 11; and when the plurality of height adjustment mechanisms 11 are adjusted to different heights, the shape of the elastic piece 16 can be changed, so that the transverse forming and arching mechanism 12 arches to perform transverse curve forming on the glass pane in the forming system 3.

In the gradual transition section 19, the transitional transverse arching mechanism 191 is of the same structure as the transverse forming and arching mechanism 12, i.e., it includes an elastic piece 16, a plurality of height adjustment mechanisms 11, and a glass conveying mechanism 14 mounted on the elastic piece 16; a center position of the elastic piece 16 in a lengthwise direction is fixed on a support beam below, and two sides of a fixed point are provided with the plurality of height adjustment mechanisms 11; one end of the height adjustment mechanism 11 is fixed on the support beam, and the other end is connected to the elastic piece 16; when the plurality of height adjustment mechanisms 11 are adjusted to different heights, the shape of the elastic piece 16 can be changed, so that the transitional transverse arching mechanism 191 arches to preform the glass pane entering the gradual transition section 19 in the transverse direction; and the support beam is fixed on the frame 1. What is different from the forming system is that no lower air grids are mounted in the gradual transition section 19.

The glass conveying mechanism 14 includes a flexible shaft 141 provided with a conveying wheel 142, supports 143, and a drive system. The flexible shaft 141 is parallel to the elastic piece 16, and is fixed on the elastic piece 16 through the supports 143 distributed at intervals; a center position of the flexible shaft 141 in the lengthwise direction is connected to the drive system to provide power to realize rotation; and the softened glass pane can be formed by means of the own weight when being conveyed by the conveying wheel 142.

Figure 14:
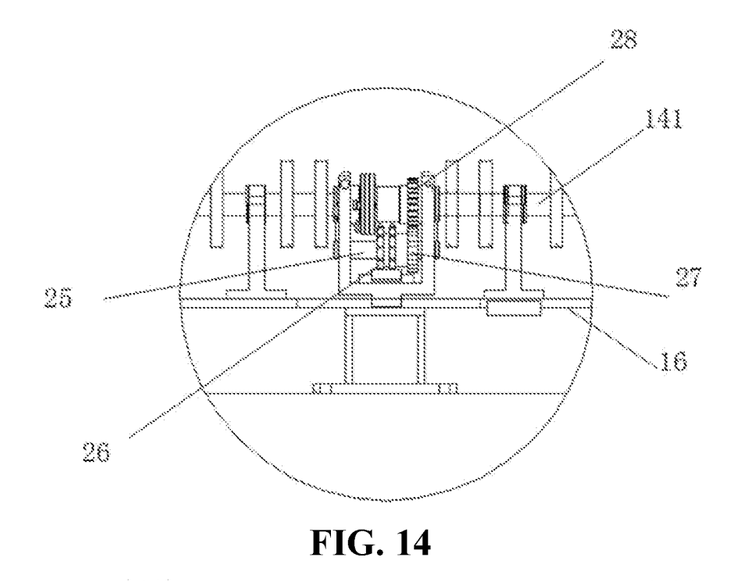
FIG. 14 is a schematic structural diagram of a drive system in the present disclosure.
Figure 15:
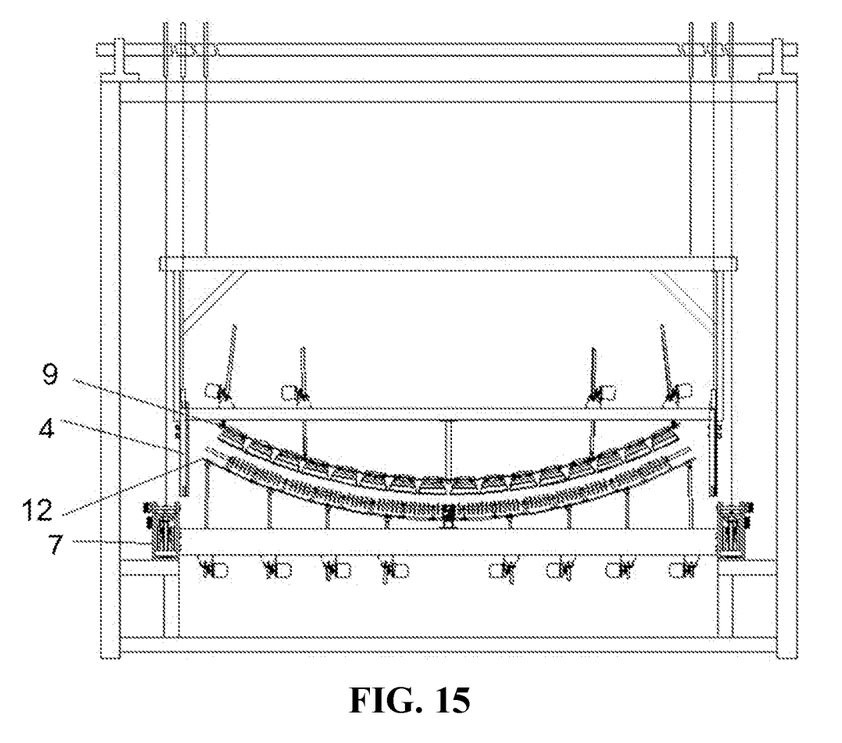
FIG. 15 is a state diagram when an upper air grid transverse arching mechanism and a transverse forming and arching mechanism are upwards curved to form an arc.
Figure 16:
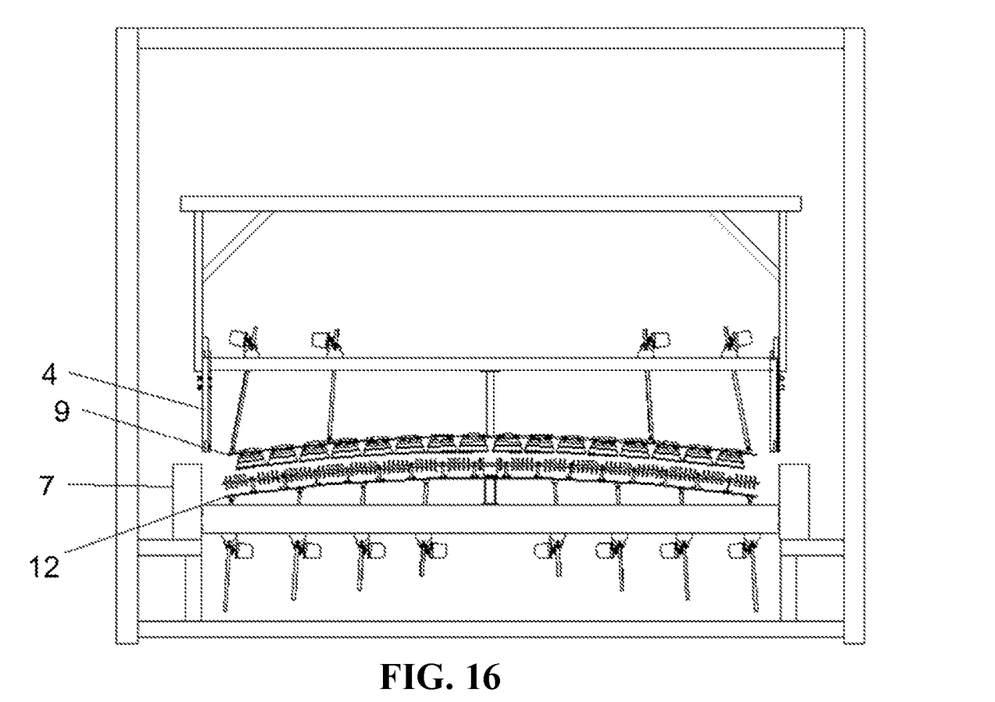
FIG. 16 is a state diagram when an upper air grid transverse arching mechanism and a transverse forming and arching mechanism are downwards curved to form an arc.

The drive system includes a transmission system and a drive motor; the transmission system is arranged below the middle part of the flexible shaft 141; and the drive motor transmits power to the flexible shaft 141 from the middle part of the flexible shaft 141 through the transmission system. As such, the phenomenon that a driving side and a driven side rotate asynchronously during transmission of the flexible shaft 141 can be avoided. Moreover, axial movement of the flexible shaft 141 on the support 143 can be reduced, deviation of glass during motion can be avoided, and the glass shape accuracy can be improved. Furthermore, the flexible shaft needs to participate in arching, and therefore the height of the end part of the flexible shaft 141 is not fixed. When power is provided from the end part of the flexible shaft 141, this has an extremely high requirement for the structure of the transmission system, and it is so hard to realize in case of guaranteeing the arching accuracy. There are two cases for the "middle part". In the first case, when the flexible shaft 141 is a long shaft, the "middle part" refers to the center position of the flexible shaft 141 in the lengthwise direction; and in the second case, when the flexible shaft 141 is formed by connecting two half shafts, the "middle part" refers to a joint of the two half shafts.

Further, the transmission system includes a rotating shaft 25 arranged below the middle part of the flexible shaft 141, and a driving chain wheel 26 and a driving gear 27 which are fixed on the rotating shaft 25; and a driven gear 28 meshing with the driving gear 27 is fixed on the flexible shaft 141.

Figure 6:
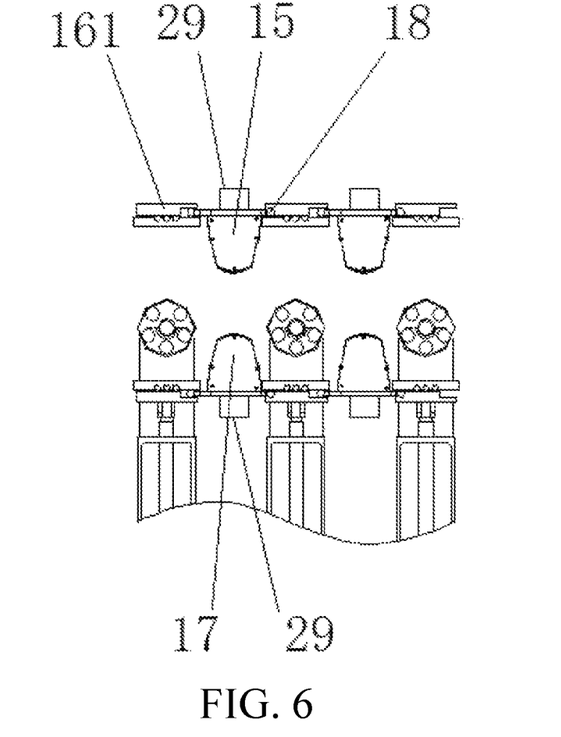
FIG. 6 is a schematic diagram of installation of upper air blowing boxes and lower air blowing boxes in the present disclosure.

The lower air grid is composed of a plurality of lower air blowing boxes 17 arranged between adjacent transverse forming and arching mechanisms 12 in an axial direction of the flexible shaft 141; the lower air blowing box 17 is internally provided with an air blowing passage, and the air blowing passages of the lower air blowing boxes 17 are not mutually communicated; the lower air blowing boxes 17 are mounted on the elastic piece 16, so that angles and positions of the lower air blowing boxes 17 vary with the arching actions of the transverse forming and arching mechanisms 12 and the longitudinal forming and arching mechanisms 7.

Figure 3:
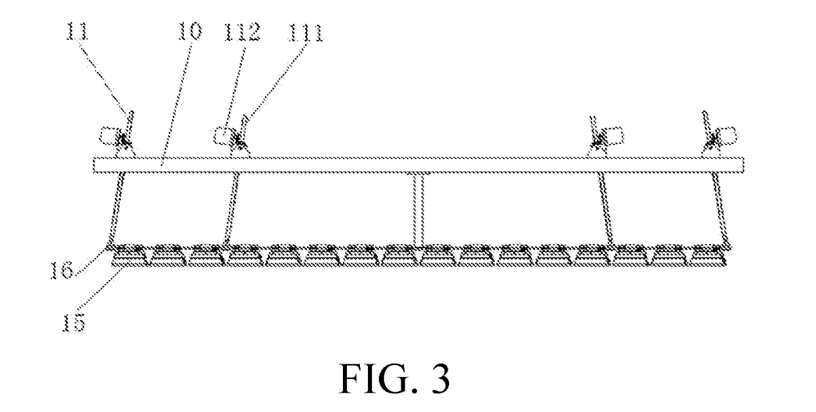
FIG. 3 is a schematic structural diagram of an upper air grid transverse arching mechanism in the present disclosure.
Figure 9:
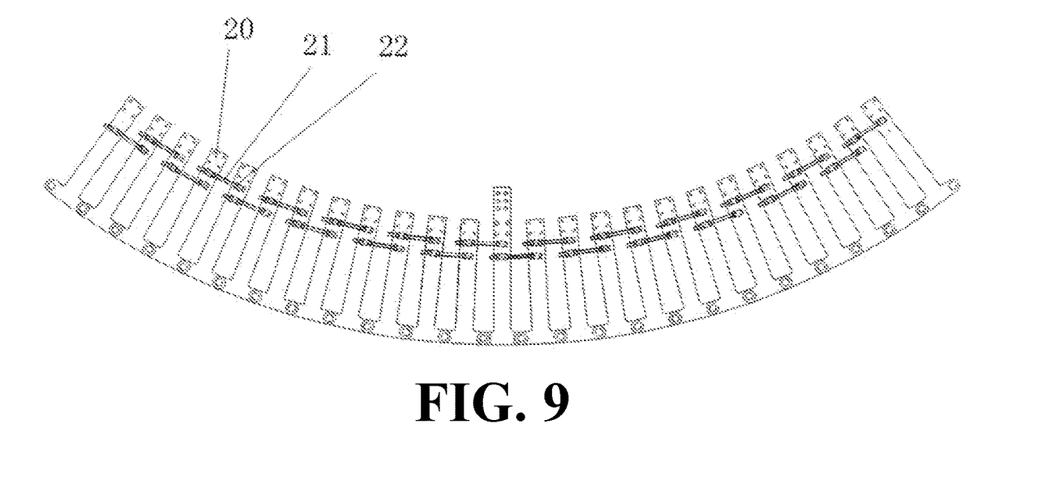
FIG. 9 is a schematic structural diagram of an upper air grid longitudinal arching mechanism in the present disclosure.

The upper air grid includes an upper air grid longitudinal arching mechanism 4 and an upper air grid transverse arching mechanism 9; the upper air grid longitudinal arching mechanism 4 is connected to an upper arching mechanism 5 mounted on the frame 1; and the upper air grid transverse arching mechanism 9 is connected to the upper air grid longitudinal arching mechanism 9 through an upper support cross beam 10.

The upper arching mechanism 5 includes a power mechanism and a pulling mechanism. The pulling mechanism can adopt a chain and chain wheel mechanism or
 a steel wire rope, etc. The structure of the lower arching mechanism 8 is the same as the structure of the upper arching mechanism 5.

The upper air grid transverse arching mechanism 9 uses the same elastic piece 16 and height adjustment mechanisms 11 as the transverse forming and arching mechanism 12. The center position of the elastic piece 16 in the lengthwise direction is fixed on the upper support cross beam 10, and two sides of a fixed point are connected to the upper support cross beam 10 through the height adjustment mechanisms 11; when the plurality of height adjustment mechanisms 11 are adjusted to different heights, the shape of the elastic piece 16 can be changed, so that the upper air grid transverse arching mechanism 9 arches. The upper air grid further includes a plurality of upper air blowing boxes 15 arranged between adjacent upper air grid transverse arching mechanisms 9 in the axial direction of the elastic piece 16; air blowing passages are formed in the upper air blowing boxes 15, and the air blowing passages of the upper air blowing boxes 15 are not mutually communicated; the upper air blowing boxes 15 are mounted on the elastic piece 16, so that angles and positions of the upper air blowing boxes 15 vary with the arching actions of the upper air grid transverse arching mechanisms 9 and the upper air grid longitudinal arching mechanisms 4.

Figure 7:
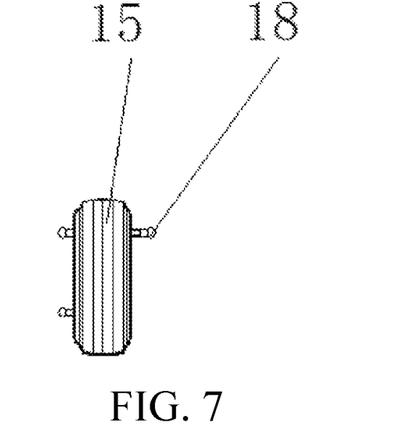
FIG. 7 is a schematic structural diagram of an upper air blowing box in the present disclosure.

The upper air blowing box 15 and the lower air blowing box 17 are each provided with an independent air inlet 29 to connect an air inlet hose; sides of the upper air blowing box 15 and the lower air blowing box 17 close to the glass pane are arc-shaped surfaces; and a plurality of air blowing ports are uniformly distributed on the arc-shaped surfaces.

Figure 8:
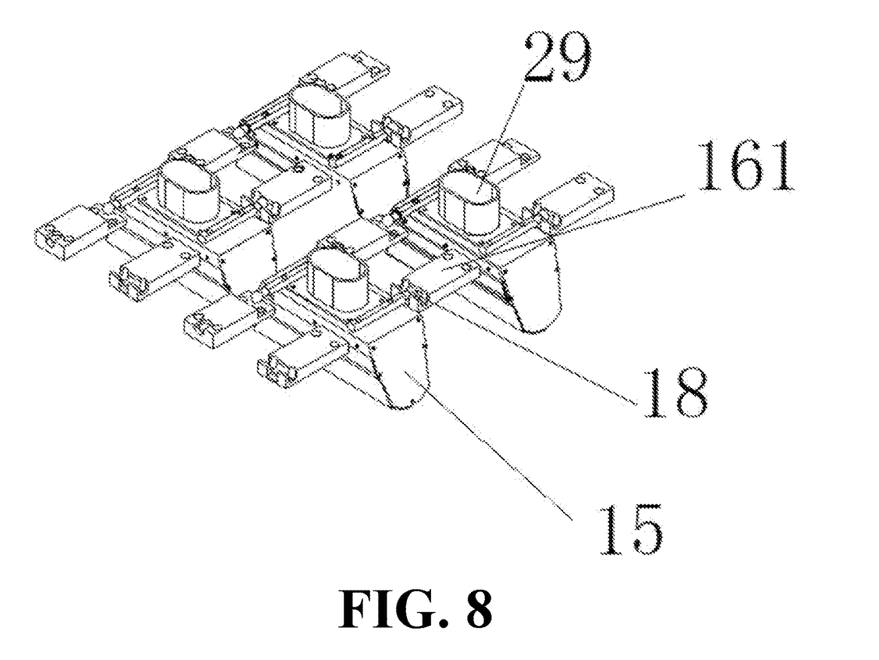
FIG. 8 is a schematic diagram of installation of an upper air blowing box in the present disclosure.

Further, the elastic piece 16 can select one of a spring steel wire, a steel spring plate or a carbon fiber elastic piece. As shown in FIG. 6 to FIG. 8, the elastic piece 16 uses three spring steel wires; a plurality of pressing pieces 161 for clamping and fixing the spring steel wires are arranged in the lengthwise direction of the elastic piece 16; each pressing piece 161 is formed by fixedly connecting an upper sheet with a lower sheet; the middle parts of the lower sheets are provided with grooves for accommodating the spring steel wires (the grooves are not shown in FIG. 8), and the spring steel wires are clamped by the upper sheets pressing the lower sheets; the end parts of the lower sheets or the upper sheets are provided with grooves; the grooves are cooperatively assembled with extending parts 18 on the upper and lower air blowing boxes 15, 17; and one side of each of the upper and lower air blowing boxes 15, 17 is provided with two extending parts 18, and the other side is provided with one extending part 18, or only one side of each of the upper and lower air blowing boxes 15, 17 is provided with two extending parts 18.

The upper air blowing box 15 and the lower air blowing box 17 can also be mounted between two adjacent elastic pieces 16 in other ways, and are only connected to one of the elastic pieces 16. For example, connection to the elastic piece 16 can be realized by means of a connecting plate; the connecting plate can be used as one part of the structures of the upper air blowing box 15 and the lower air blowing box 17, or can be used as a component on the elastic piece 16 to suspend the upper air blowing box 15 and the lower air blowing box 17 on one side of the elastic piece 16.

The height adjustment mechanism 11 can adopt a screw rod and nut mechanism 111 driven by a motor 112, or a gear and rack mechanism driven by a motor, and can also use other mechanisms that can realize linear motion, such as an electric push rod.

In this example, the height adjustment mechanism 11 includes the screw rod and nut mechanism 111 and the motor 112; the screw rod and nut mechanism 111 includes a screw rod and a nut which cooperate with each other; one end part of the screw rod is connected to the elastic piece 16 through the connecting plate, and the screw rod and the connecting plate are rotatably connected; the motor 112 is fixed on a motor base; the motor base is rotatably connected to the upper support cross beam 10 or the lower support cross beam 13; and the nut is driven to rotate by the motor 112 by means of a bevel gear pair to realize the linear motion of the screw rod.

Figure 10:
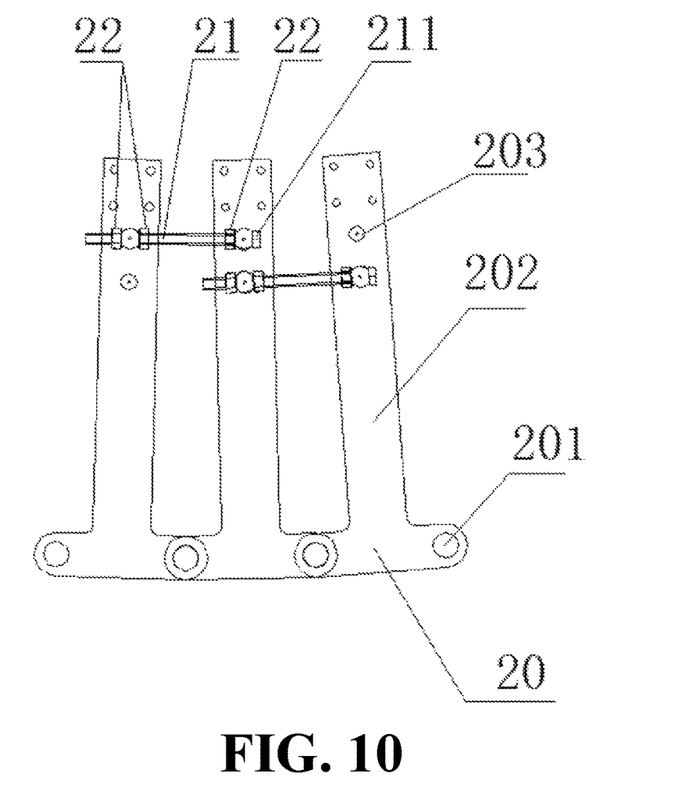
FIG. 10 is a schematic structural diagram after connecting plates in FIG. 9 are connected.

The upper air grid longitudinal arching mechanism 4 is formed by hinging a plurality of connecting plates 20 end to end in sequence; the connecting plate 20 includes a protruding end 202 away from a hinge point 201; the lengthwise direction of the protruding end 202 is perpendicular to a connecting line of the hinge points at two ends of the connecting plate 20; and the protruding end 202 is arranged along a perpendicular bisector of the connecting line of two hinge points; the protruding ends 202 of two adjacent connecting plates 20 are connected through a bolt 21; two ends of the bolt 21 are respectively hinged to the protruding ends 202 of the two adjacent connecting plates 20; the bolt 21 is connected with the nut 22 for adjusting a distance between the protruding ends 201 of two adjacent connecting plates 20 through threads; and the end part of the upper support cross beam 10 is fixedly connected to the connecting plates 20.

The protruding end 202 of the connecting plate 20 is provided with two rotating shafts 203 that are perpendicular to the board surface of the protruding end 202 and capable of freely rotating; the two rotating shafts 203 are arranged up and down; each rotating shaft 203 is provided with a shaft hole perpendicular to the axial direction of the rotating shaft 203 so as to arrange the bolt 21 in a penetrating manner, and two ends of the bolt 21 are respectively disposed in the shaft holes of the two rotating shafts 203 on adjacent connecting plates 20 at the same height in a penetrating manner; an aperture of the shaft hole is greater than a diameter of the bolt 21, so as to provide a space for the movement between the connecting plates 20 in the arching process.

In the two rotating shafts 203 on the connecting plate 20, two sides of one rotating shaft 203 are respectively a bolt head 211 and a nut 22, and two sides of the other rotating shaft 203 are respectively two nuts 22.

The distances between the protruding ends 202 of the connecting plates 20 determine a radian of an arc formed by the upper air grid longitudinal arching mechanism 4. Therefore, before the apparatus is used, the distances between the protruding ends 202 of adjacent connecting plates 20 need to be adjusted by means of adjusting the positions of the nuts 22 on the bolts 21, so as to meet a need for glass forming.

The connecting plate 20 can be a T-shaped connecting plate, a tee-heeded connecting plate, a trapezoid connecting plate, or can be a triangular connecting plate, or is of other shapes satisfying the shape characteristic of the connecting plate.

Figure 11:
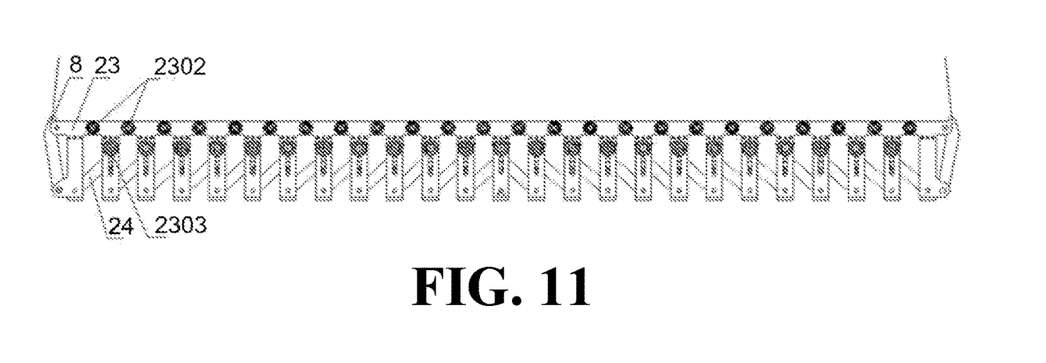
FIG. 11 is a schematic structural diagram of a longitudinal forming and arching mechanism in the present disclosure.
Figure 12:
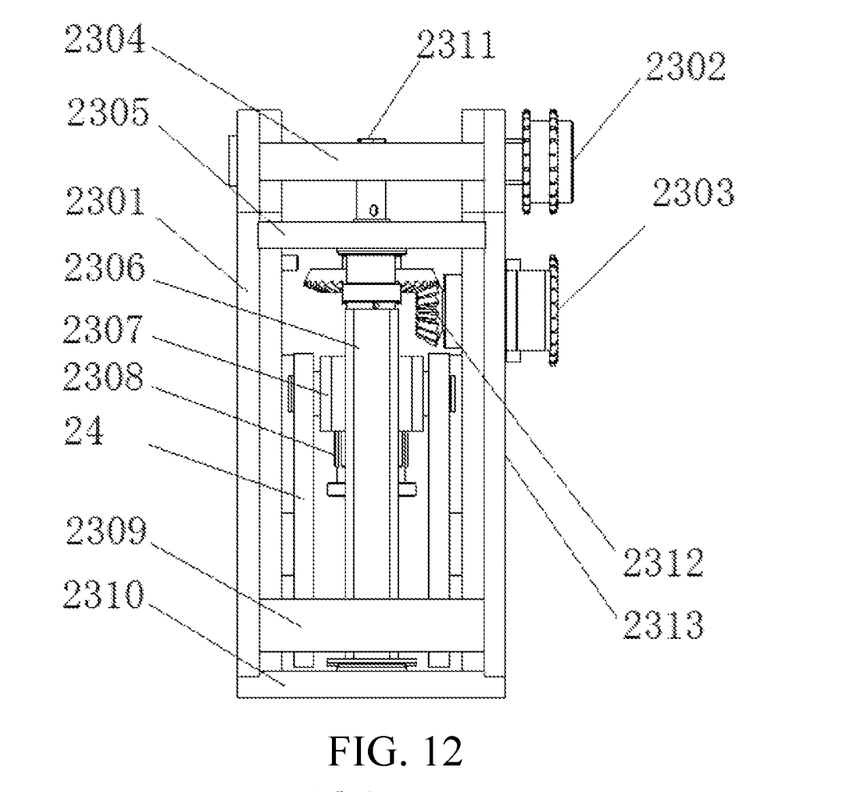
FIG. 12 is a schematic structural diagram of a chain plate assembly in FIG. 11.

As shown in FIG. 11 and FIG. 12, the longitudinal forming and arching mechanism 7 in the forming system 3 is formed by rotatably connecting a plurality of chain plate assemblies 23 end to end in sequence through rotating shafts 2304; adjacent chain plate assemblies 23 are connected through a single connecting rod 24; the chain plate assembly 23 includes two chain plates 2301 that are fixedly connected; the chain plate 2301 has two shaft holes used for mounting the rotating shafts 2304 and a protruding part 2313; the lengthwise direction of the protruding part 2313 is perpendicular to a connecting line of the two shaft holes; a sliding block adjustment mechanism is mounted between the two chain plates 2301; the sliding block adjustment mechanism includes a screw rod 2306, a splined hub 2308, and a sliding block 2307; two ends of the screw rod 2306 are rotatably connected to a top plate 2305 and a bottom plate 2310 of the chain plate assembly 23, and one end of the screw rod 2306 is a hexagonal shaft 2311; the splined hub 2308 is in threaded connection with the screw rod 2306, and the splined hub 2306 is slidably connected with the sliding block 2307 through external splines; a spline slot of the external spline is parallel to the axial direction of the screw rod 2306; one end of the connecting rod 24 is rotatably connected to the sliding block 2307, and the other end of the connecting rod 24 is rotatably connected to the adjacent screw rod 2306; an adjustment chain wheel 2303 capable of being connected to power to drive the screw rod 2306 to rotate is arranged on the protruding part 2313; the end part of the rotating shaft 2304 is provided with a duplex chain wheel 2302; the adjustment chain wheels 2303 and the duplex chain wheels 2302 on the plurality of chain plate assemblies 23 are connected through chains and rotate synchronously; and the chains are tensioned by tensioning mechanisms arranged on the chain plates 2301.

The adjustment chain wheel 2303 drives the screw rod 2306 to rotate through the bevel gear pair 2312; and the bevel gear pair 2312 is formed by meshing a bevel gear arranged on the screw rod 2306 and a bevel gear arranged on an axle of the adjustment chain wheel 2303.

The duplex chain wheel 2302 and the adjustment chain wheel 2303 on the chain plate 2301 are in an equilateral triangle layout, and are connected with the chains; and two chains in adjacent chain plate assemblies 23 are respectively mounted on the duplex chain wheel 2302 shared by the two chain plate assemblies 23, thereby realizing synchronous rotation of all the adjustment chain wheels 2303.

The tensioning mechanism includes a tensioning wheel and an L-shaped mounting seat which are mounted on the chain plates 2301; one end of the mounting seat is provided with an elongated slot; the mounting seat is fixed on the board surface of the chain plate 2301 by means of cooperation of a screw and the elongated slot; the other end of the mounting seat is provided with an adjustment screw; the adjustment screw is connected to the end part of the chain plate 2301; and by adjusting the screw-in amount of the adjustment screw, the mounting seat can move up and down along the elongated slot to tension the chain.

The bottom end of the splined hub 2308 is provided with a sliding block stop ring; in the arching process of the arching mechanism, the sliding block 2307 slides down along the spline slot; after the sliding block 2307 presses the sliding block stop ring, an angle between adjacent chain plate assemblies 23 is maximum, and the radius of a formed arc is minimum.

The sliding blocks 2307 on all the chain plate assemblies 23 can be driven to be adjusted to the same position when the adjustment chain wheels 2303 are connected to external power, so as to complete equal-arc adjustment. At this time, equal-arc curved tempered glass can be produced. After connection between the adjustment chain wheels 2303 is cut off, the hexagonal shafts 2311 at the end parts of the screw rods 2306 are adjusted to separately adjust the sliding blocks 2307 on the screw rods 2306, so that unequal arcs are obtained after arching. This is unequal-arc adjustment at this time, and can be used for producing unequal-arc curved tempered glass.

The chain plate 23 is a T-shaped chain plate, a tee-heeded chain plate or a trapezoid chain plate, or is of other shapes that satisfy the characteristic of the chain plate.

A forming method for multi-curved-surface tempered glass is provided. The forming method is executed by using the above forming apparatus, and includes the following steps:

Step I: the transitional transverse arching mechanisms 191 in the gradual transition section 19 and the transverse forming and arching mechanisms 12 in the forming system 3 are adjusted to desired positions according to a radian requirement for glass to be formed in a transverse direction, and the upper air grid transverse arching mechanisms 9 and the upper air grid longitudinal arching mechanisms 4 of the upper air grid group are adjusted to desired positions according to radian requirements of a glass pane to be formed in the transverse direction and a longitudinal direction;

Step II: the glass pane heated to a softened state is enabled to leave a heating furnace and enter the gradual transition section 19 to complete transverse gradual preforming of the glass pane;

Step III: the glass pane is enabled to enter the forming system 3 from the gradual transition section 19 for transverse curve forming under the gravity;

Step IV: two ends of the longitudinal forming and arching mechanisms 7 are pulled to desired positions to make the glass pane complete longitudinal curve forming;

Step V: the glass pane completing the transverse and longitudinal curve forming is enabled to move in the forming system 3 in a reciprocating manner, and the upper air grid group and the lower air grid group are enabled to blow air to cool the glass pane to complete tempering; and Step VI: two ends of the longitudinal forming and arching mechanisms 7 are pulled to horizontal positions, the upper air grid group is lifted to a set height through the lifting mechanism, and the tempered glass pane is conveyed out of the forming system 3.

In addition, the forming method for multi-curved-surface tempered glass can further adjust the steps on the basis of the above steps to derive two forming methods with different operations. The derivative methods are described below.

Derivative Method 1

In Derivative method 1, before the glass pane enters the forming system 3, the upper air grid longitudinal arching mechanisms 4 are not adjusted, but are synchronously adjusted with the longitudinal forming and arching mechanisms 7.

Specific Steps of Derivative Method 1 are as Follows:

Step I: the transitional transverse arching mechanisms 191 in the gradual transition section 19, the transverse forming and arching mechanisms 12 in the forming system 3, and the upper air grid transverse arching mechanisms 9 of the upper air grid group are adjusted to desired positions according to a radian requirement for glass to be formed in the transverse direction;

Step II: the glass pane heated to a softened state is enabled to leave a heating furnace and enter the gradual transition section 19 to complete transverse gradual preforming of the glass pane;

Step III: the glass pane is enabled to enter the forming system 3 from the gradual transition section 19 for transverse curve forming under the gravity;

Step IV: the two ends of the longitudinal forming and arching mechanisms 7 and the two ends of the upper air grid transverse arching mechanisms 4 of the upper air grid group are pulled to desired positions to make the glass pane complete longitudinal curve forming;

Step V: the glass pane completing the transverse and longitudinal curve forming is enabled to move in the forming system 3 in a reciprocating manner, and the upper air grid group and the lower air grid group are enabled to blow air to cool the glass pane to complete tempering; and Step VI: the two ends of the longitudinal forming and arching mechanisms 7 are pulled to horizontal positions, the upper air grid group is lifted to a set height through the lifting mechanism 6, and the tempered glass pane is conveyed out of the forming system 3.

Derivative Method 2

In Derivative method 2, ends of the longitudinal forming and arching mechanisms 7 close to an outlet side of the forming system 3 need to be pulled to desired positions before glass enters the forming system 3. This is because the temperature of the front end that enters the forming system 3 first is lower due to a larger longitudinal size after a large-size glass pane enters the forming system 3. At this time, if the longitudinal forming and arching mechanisms 7 are pulled for arching after the whole glass pane enters the forming system 3, it is very hard to form an arc at the front end of the glass pane due to the lower temperature. Therefore, in this method, before the glass pane enters the forming system 3, the ends of the longitudinal forming and arching mechanisms 7 close to the outlet side of the forming system 3 are pulled to the desired positions to avoid the problem that the front end of the glass pane is hard to form, thus improving the quality of curve forming of the large-size glass pane.

Specific Steps of Derivative Method 2 are as Follows:

Step I: the transitional transverse arching mechanisms 191 in the gradual transition section 19 and the transverse forming and arching mechanisms 12 in the forming system 3 are adjusted to desired positions according to a radian requirement for glass to be formed in the transverse direction, the upper air grid transverse arching mechanisms 9 and the upper air grid longitudinal arching mechanisms 4 of the upper air grid group are adjusted to desired positions according to radian requirements of the glass pane to be formed in the transverse direction and the longitudinal direction, and ends of the longitudinal forming and arching mechanisms 7 located at the outlet side of the forming system 3 are pulled to desired positions;

Step II: the glass pane heated to a softened state is enabled to leave a heating furnace and enter the gradual transition section 19 to complete transverse gradual preforming of the glass pane;

Step III: the glass pane is enabled to enter the forming system 3 from the gradual transition section 19 for transverse curve forming under the gravity;

Step IV: ends of the longitudinal forming and arching mechanisms 7 located at an inlet side of the forming system 3 are pulled to make the glass pane complete longitudinal curve forming;

Step V: the glass pane completing the transverse and longitudinal curve forming is enabled to move in the forming system 3 in a reciprocating manner, and the upper air grid group and the lower air grid group are enabled to blow air to cool the glass pane to complete tempering; and Step VI: the two ends of the longitudinal forming and arching mechanisms 7 are pulled to horizontal positions, the upper air grid group is lifted to a set height through the lifting mechanism 6, and the tempered glass pane is conveyed out of the forming system 3.

The above apparatus can be used to produce various specially-shaped curved-surface glass such as transverse single-curved-surface unequal-arc glass, longitudinal positive and negative curved single-curved-surface glass, unidirectional hyperboloid glass, and positive and negative curved bidirectional multi-curved-surface glass. Different production processes can be selected according to a specific radius and arch rise of glass.

1) Production of the Transverse Single-Curved-Surface Unequal-Arc Glass

The transitional transverse arching mechanisms 191, the transverse forming and arching mechanisms 12, and the upper air grid transverse arching mechanisms 9 are all adjusted to be horizontal; the longitudinal forming and arching mechanisms 7 are kept flat; the upper air grid longitudinal arching mechanisms 4 are adjusted to a desired radius; after glass is conveyed out of the furnace and moves through the gradual transition section 19 to a specified position of the forming system 3, the lower arching mechanism 8 lifts and pulls the longitudinal forming and arching mechanisms 7 to realize arching; the glass pane is arched under the gravity and swings in a reciprocating manner in the forming system 3; and air is blown for cooling to complete tempering.

2) Production of Longitudinal Positive and Negative Curved Single-Curved-Surface Glass The transitional transverse arching mechanisms 191, the transverse forming and arching mechanisms 12, and the upper air grid transverse arching mechanisms 9 are all adjusted to desired radii; the longitudinal forming and arching mechanisms 7 and the upper air grid longitudinal arching mechanisms 4 are kept flat; glass is conveyed out of the furnace, is gradually formed through the gradual transition section, and enters the lower air grid position of the forming system 3; the glass pane is arched under the gravity and swings in a reciprocating manner in the forming system 3; and air is blown for cooling to complete tempering.

Figure 17:
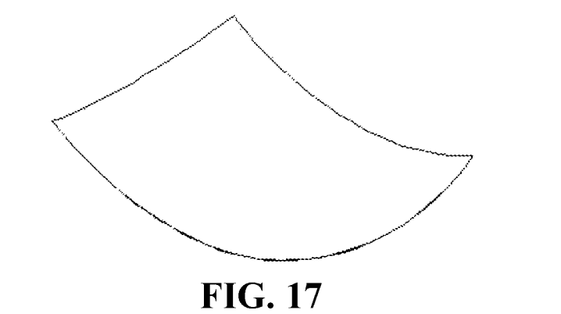
FIG. 17 is a schematic diagram of unidirectional hyperboloid glass.

3) Production of Unidirectional Hyperboloid Glass as Shown in FIG. 17

Firstly, the transverse forming and arching mechanisms 12 in the forming system 3 are all adjusted to a desired radius position, and the longitudinal forming and arching mechanisms 7 are kept flat; the upper air grids are adjusted to positions matching with the shapes of the transverse forming and arching mechanisms 12; secondly, a glass pane heated to a softened state leaves the heating furnace, enters the gradual transition section 19, and is curved and gradually formed by the gradual transition section 19 in the transverse direction of the glass pane; after the whole gradually formed glass pane enters the forming system 3, two ends of the longitudinal forming and arching mechanisms 7 are pulled by the lower arching mechanism 8 to desired positions for arching; at the same time, the upper air grids are adjusted in the longitudinal direction to positions matching with the shapes of the longitudinal forming and arching mechanisms 7; the glass pane is formed under the gravity and swings in a reciprocating manner in the forming system 3; and air is blown for cooling to complete tempering.

Figure 18:
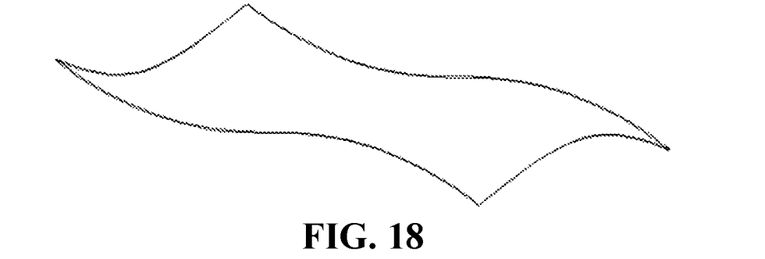
FIG. 18 is a schematic diagram of positive and negative bidirectional multi-curved-surface glass.

4) Production of Positive and Negative Bidirectional Multi-Curved-Surface Glass as Shown in FIG. 18

Firstly, the transverse forming and arching mechanisms 12 in the forming system 3 are adjusted to a desired radius, and a relative height between the transitional transverse arching mechanisms 191 and the transverse forming and arching mechanisms 12 is adjusted according to the shape of the formed glass; the upper air grids are correspondingly adjusted to positions matching with the shapes of the transverse forming and arching mechanisms 12; secondly, a glass pane heated to a softened state leaves the heating furnace, enters the gradual transition section, and is curved and gradually formed by the gradual transition section 19 in the transverse direction of the glass pane; after the whole gradually formed glass pane enters the forming system 3, two ends of the longitudinal forming and arching mechanisms 7 are pulled by the lower arching mechanism 8 to desired positions for arching; at the same time, the upper air grids are adjusted in the longitudinal direction to positions matching with the shapes of the longitudinal forming and arching mechanisms 7; the glass pane is formed under the gravity and swings in a reciprocating manner in the forming system 3; and air is blown for cooling to complete tempering.

What is claimed is:

1. A forming apparatus for curved tempered glass, comprising a frame, a gradual transition section, an air grid system, and a forming system, wherein:

the air grid system comprises an upper air grid group comprising a plurality of upper air grids, and a lower air grid group comprising a plurality of lower air grids;

the upper air grid group is mounted at an upper half of the frame, and the lower air grid group is mounted at a lower half of the frame;

the gradual transition section is arranged at an inlet side of the forming system;

the gradual transition section comprises a plurality of transitional transverse arching mechanisms arranged in a glass pane conveying direction to enable a glass pane to be gradually arched in a transverse direction, and the gradually arched glass pane is conveyed into the forming system;

the forming system comprises two groups of longitudinal forming and arching mechanisms and a plurality of transverse forming and arching mechanisms arranged in the glass pane conveying direction;

the longitudinal forming and arching mechanisms are controlled by a lower arching mechanism to perform longitudinal curve forming on the glass pane in the forming system; the transverse forming and arching mechanisms are connected to the longitudinal forming and arching mechanisms through a lower support cross beam to perform transverse curve forming on the glass pane in the forming system;

the transverse forming and arching mechanism comprises a first elastic piece, a first plurality of height adjustment mechanisms and a first glass conveying mechanism mounted on the first elastic piece; a center position or a middle section of the first elastic piece in a lengthwise direction is fixed on the lower support cross beam; two sides of the center position or the middle section are connected to the lower support cross beam through the first plurality of height adjustment mechanisms; the first elastic piece is arched by adjusting the first plurality of height adjustment mechanisms; and the lower air grid is composed of a plurality of lower air blowing boxes; the plurality of lower air blowing boxes are arranged between adjacent transverse forming and arching mechanisms in the lengthwise direction of the first elastic piece; the lower air blowing boxes are mounted on the first elastic piece, so that the lower air blowing boxes act with arching actions of the transverse forming and arching mechanisms and the longitudinal forming and arching mechanisms.

2. The forming apparatus for curved tempered glass according to claim 1, wherein:

the transitional transverse arching mechanism comprises a second elastic piece, a second plurality of height adjustment mechanisms, and a second glass conveying mechanism mounted on the second elastic piece;

a center position or a middle section of the second elastic piece in a lengthwise direction is fixed on a support beam, and two sides of a fixed point are connected to the support beam through the second plurality of height adjustment mechanisms; the second elastic piece is arched by adjusting the second plurality of height adjustment mechanisms; and the support beam is fixed on the frame.

3. The forming apparatus for curved tempered glass according to claim 1, wherein:

the first glass conveying mechanism comprises a flexible shaft provided with a conveying wheel, supports, and a flexible shaft drive system;

the flexible shaft is fixed on the first elastic piece through the supports distributed at intervals; and the flexible shaft drive system transmits power to the flexible shaft from a center region of the flexible shaft in the lengthwise direction.

4. The forming apparatus for curved tempered glass according to claim 3, wherein the flexible shaft is parallel to the first elastic piece.

5. The forming apparatus for curved tempered glass according to claim 1, wherein the lower air blowing boxes are respectively provided with independent air ducts.

6. The forming apparatus for curved tempered glass according to claim 2, wherein the second elastic piece is any one of a spring steel wire, a steel spring plate or a carbon fiber elastic piece.

7. The forming apparatus for curved tempered glass according to claim 1, wherein:

the upper air grid comprises an upper air grid longitudinal arching mechanism and an upper air grid transverse arching mechanism;

the upper air grid longitudinal arching mechanism is connected to an upper arching mechanism mounted on the frame; and the upper air grid transverse arching mechanism is connected to the upper air grid longitudinal arching mechanism through an upper support cross beam.

8. The forming apparatus for curved tempered glass according to claim 7, wherein the upper arching mechanism and the lower arching mechanism each comprises a power mechanism and a pulling mechanism; the power mechanism is a motor; and
the pulling mechanism is a chain and chain wheel mechanism or a steel wire rope.

9. A forming apparatus for curved tempered glass, comprising a frame, a gradual transition section, an air grid system, and a forming system, wherein:
the air grid system comprises an upper air grid group comprising a plurality of upper air grids, and a lower air grid group comprising a plurality of lower air grids;
the upper air grid group is mounted at an upper half of the frame, and the lower air grid group is mounted at a lower half of the frame;
the gradual transition section is arranged at an inlet side of the forming system;
the gradual transition section comprises a plurality of transitional transverse arching mechanisms arranged in a glass pane conveying direction to enable a glass pane to be gradually arched in a transverse direction, and the gradually arched glass pane is conveyed into the forming system;
the forming system comprises two groups of longitudinal forming and arching mechanisms and a plurality of transverse forming and arching mechanisms arranged in the glass pane conveying direction;
the longitudinal forming and arching mechanisms are controlled by a lower arching mechanism to perform longitudinal curve forming on the glass pane in the forming system; the transverse forming and arching mechanisms are connected to the longitudinal forming and arching mechanisms through a lower support cross beam to perform transverse curve forming on the glass pane in the forming system;
the upper air grid comprises an upper air grid longitudinal arching mechanism and an upper air grid transverse arching mechanism; the upper air grid longitudinal arching mechanism is connected to an upper arching mechanism mounted on the frame; and the upper air grid transverse arching mechanism is connected to the upper air grid longitudinal arching mechanism through an upper support cross beam;
the upper air grid transverse arching mechanism comprises an elastic piece and a height adjustment mechanism; a center position or a middle section of the elastic piece in a lengthwise direction is fixed on the upper support cross beam, and two sides of a fixed point is connected to the upper support cross beam through the height adjustment mechanism; the upper air grid further comprises a plurality of upper air blowing boxes; the plurality of upper air blowing boxes are arranged between adjacent upper air grid transverse arching mechanisms in the lengthwise direction of the elastic piece; and the upper air blowing boxes are mounted on the elastic piece, so that the upper air blowing boxes act with arching actions of the upper air grid transverse arching mechanisms and the upper air grid longitudinal arching mechanisms.

10. The forming apparatus for curved tempered glass according to claim 9, wherein the upper air blowing boxes are respectively provided with independent air ducts.

11. The forming apparatus for curved tempered glass according to claim 7, wherein:
the upper air grid longitudinal arching mechanism is formed by hinging a plurality of connecting plates end to end in sequence; the connecting plate comprises a protruding end away from a hinge point;
the protruding ends of two adjacent connecting plates are connected through a bolt, and two ends of the bolt are hinged with the protruding ends of the two adjacent connecting plates;
the bolt is connected with a nut through threads; and
end parts of the upper support cross beam are fixedly connected to the connecting plates.

12. The forming apparatus for curved tempered glass according to claim 11, wherein the connecting plate is a T-shaped plate, a tee-heeded plate, a trapezoid plate or a triangular plate.

13. A forming apparatus for curved tempered glass, comprising a frame, a gradual transition section, an air grid system, and a forming system, wherein:
the air grid system comprises an upper air grid group comprising a plurality of upper air grids, and a lower air grid group comprising a plurality of lower air grids;
the upper air grid group is mounted at an upper half of the frame, and the lower air grid group is mounted at a lower half of the frame;
the gradual transition section is arranged at an inlet side of the forming system;
the gradual transition section comprises a plurality of transitional transverse arching mechanisms arranged in a glass pane conveying direction to enable a glass pane to be gradually arched in a transverse direction, and the gradually arched glass pane is conveyed into the forming system;
the forming system comprises two groups of longitudinal forming and arching mechanisms and a plurality of transverse forming and arching mechanisms arranged in the glass pane conveying direction;
the longitudinal forming and arching mechanism in the forming system is formed by rotatably connecting a plurality of chain plate assemblies end to end in sequence, and the chain plate assembly comprises a protruding part away from a rotatable connection point;
adjacent chain plate assemblies are connected through a connecting rod and one end of the connecting rod is provided with a sliding block capable of sliding in a lengthwise direction of the protruding part; and
the protruding part is provided with an adjustment device for adjusting a sliding travel of the sliding block.

14. The forming apparatus for curved tempered glass according to claim 13, wherein a chain plate in the chain plate assembly is a T-shaped chain plate, a tee-heeded chain plate, a trapezoid chain plate or a triangular chain plate.

15. A forming method for multi-curved-surface tempered glass, wherein:
a forming apparatus used by the forming method comprises a frame, a gradual transition section, a forming system, and an air grid system;
the gradual transition section is arranged at an inlet side of the forming system, and comprises a plurality of transitional transverse arching mechanisms arranged in a glass pane conveying direction;
the forming system comprises a plurality of transverse forming and arching mechanisms arranged in the glass pane conveying direction and two groups of longitudinal forming and arching mechanisms;
the air grid system comprises an upper air grid group comprising a plurality of upper air grids and a lower air grid group comprising a plurality of lower air grids;

the upper air grid group is mounted at an upper half of the frame, and the lower air grid group is mounted at a lower half of the frame; and the forming method comprises:

adjusting the transitional transverse arching mechanisms in the gradual transition section and the transverse forming and arching mechanisms in the forming system to desired positions according to a radian requirement for glass to be formed in a transverse direction, and adjusting upper air grid transverse arching mechanisms and upper air grid longitudinal arching mechanisms of the upper air grid group to desired positions according to radian requirements of a glass pane to be formed in the transverse direction and a longitudinal direction;

making the glass pane heated to a softened state leave a heating furnace and enter the gradual transition section to complete transverse gradual preforming of the glass pane;

making the glass pane enter the forming system from the gradual transition section for transverse curve forming under the gravity;

pulling two ends of the longitudinal forming and arching mechanisms to desired positions to make the glass pane complete longitudinal curve forming;

making the glass pane completing the transverse and longitudinal curve forming move in the forming system in a reciprocating manner, and making the upper air grid group and the lower air grid group blow air to cool the glass pane to complete tempering; and pulling the two ends of the longitudinal forming and arching mechanisms to horizontal positions, lifting the upper air grid group to a set height through a lifting mechanism, and conveying the tempered glass pane out of the forming system, wherein:

the longitudinal forming and arching mechanisms are controlled by a lower arching mechanism to perform longitudinal curve forming on the glass pane in the forming system;

the transverse forming and arching mechanisms are connected to the longitudinal forming and arching mechanisms through a lower support cross beam to perform transverse curve forming on the glass pane in the forming system;

the transverse forming and arching mechanism comprises an elastic piece, a plurality of height adjustment mechanisms and a glass conveying mechanism mounted on the elastic piece;

a center position or a middle section of the elastic piece in a lengthwise direction is fixed on the lower support cross beam;

two sides of the center position or the middle section are connected to the lower support cross beam through the plurality of height adjustment mechanisms;

the elastic piece is arched by adjusting the plurality of height adjustment mechanisms;

the lower air grid is composed of a plurality of lower air blowing boxes;

the plurality of lower air blowing boxes are arranged between adjacent transverse forming and arching mechanisms in the lengthwise direction of the elastic piece; and the lower air blowing boxes are mounted on the elastic piece, so that the lower air blowing boxes act with arching actions of the transverse forming and arching mechanisms and the longitudinal forming and arching mechanisms.

16. The forming method for multi-curved-surface tempered glass according claim 15, wherein transverse curvatures of the plurality of transitional transverse arching mechanisms in the glass pane conveying direction are increased in sequence; the curvature of one transitional transverse arching mechanism adjacent to the forming system is less than or equal to the curvature of the transverse forming and arching mechanism in the forming system; and the curvature of the transverse forming and arching mechanism is set according to the transverse curvature of the glass pane.

17. The forming method for multi-curved-surface tempered glass according to claim 15, wherein the glass conveying mechanism comprises a flexible shaft provided with a conveying wheel, supports and a flexible shaft drive system; the flexible shaft is fixed on the elastic piece through the supports distributed at intervals; and the flexible shaft drive system transmits power to the flexible shaft from a center region of the flexible shaft in the lengthwise direction.

18. The forming method for multi-curved-surface tempered glass according to claim 17, wherein the flexible shaft is parallel to the elastic piece.

19. The forming method for multi-curved-surface tempered glass according to claim 15, wherein the elastic piece is any one of a spring steel wire, a steel spring plate or a carbon fiber elastic piece.

* * * * *